United States Patent Office 2,953,892
Patented Sept. 27, 1960

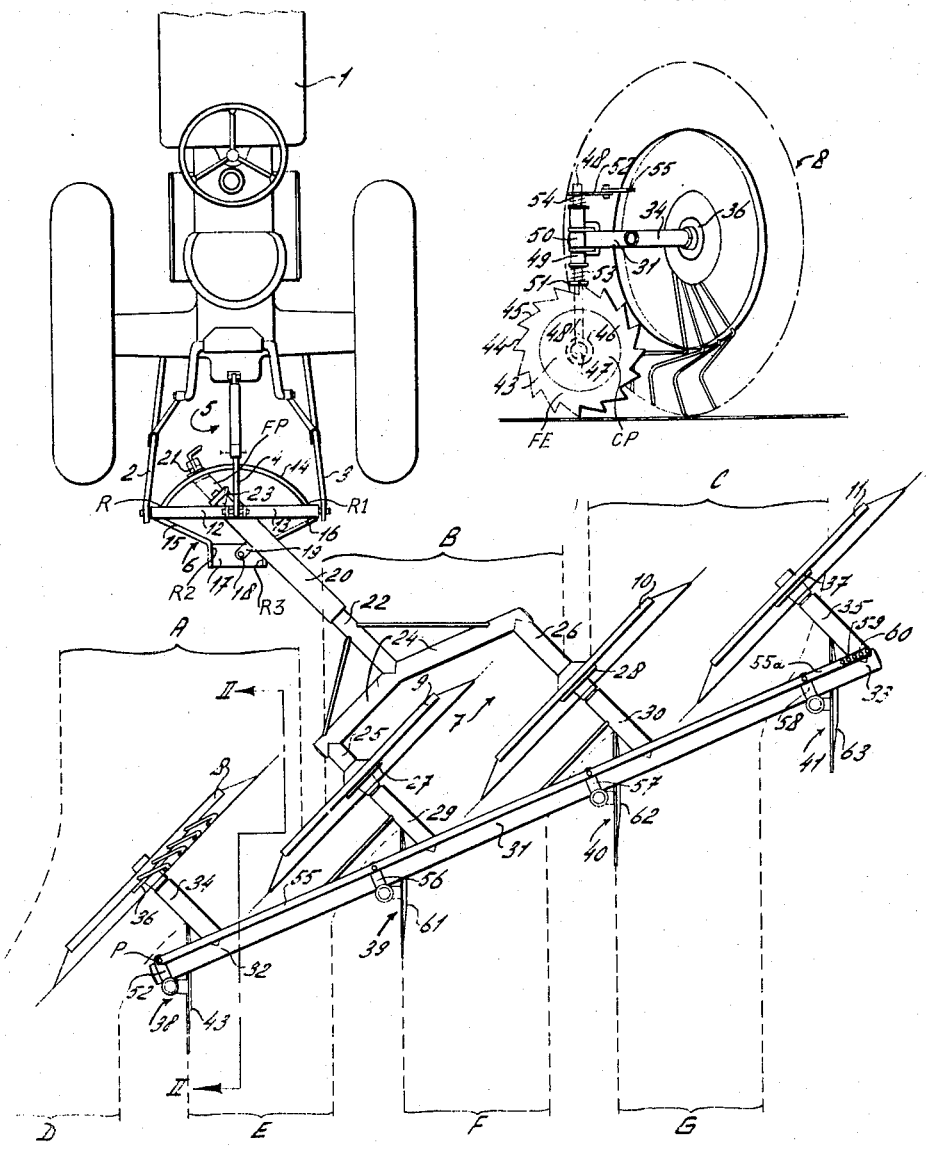

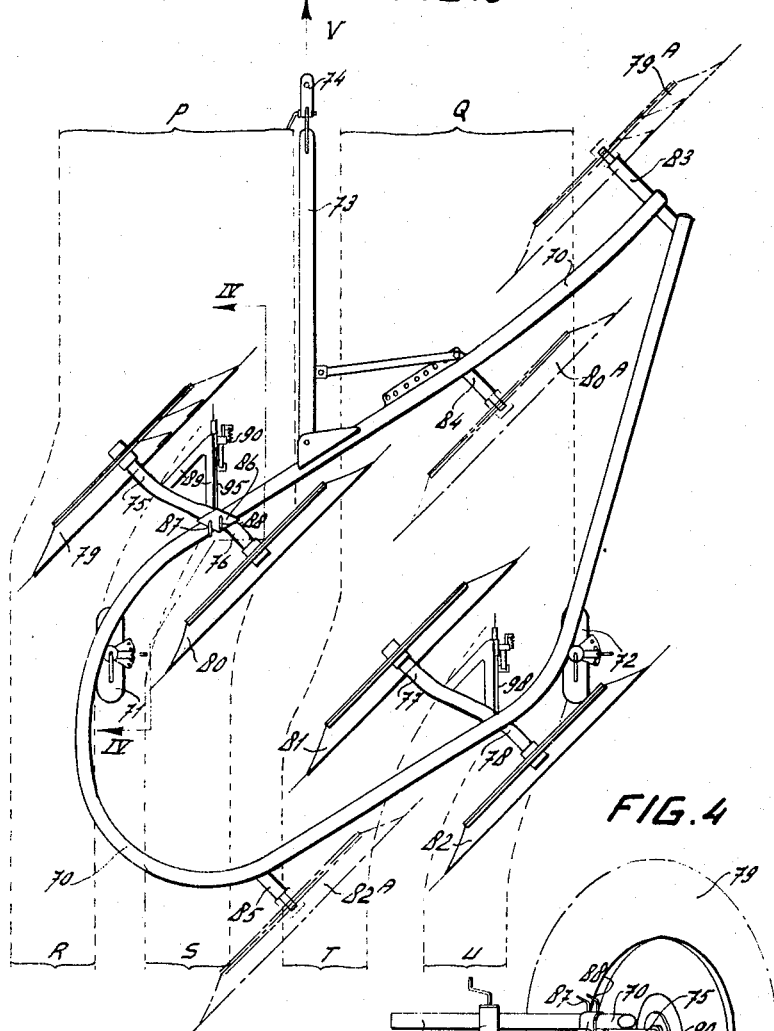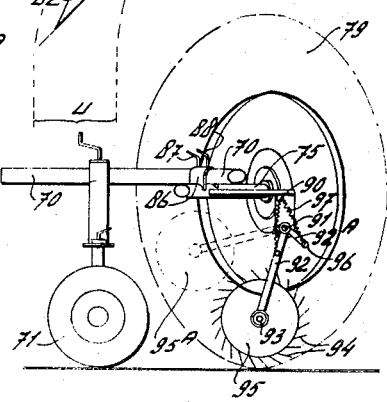

2,953,892
DEVICE FOR WORKING CROP LYING ON THE GROUND AND PROVIDED WITH AT LEAST ONE RAKING MEMBER

Cornelis van der Lely and Ary van der Lely, Maasland, Netherlands, assignors to C. van der Lely, N.V., Maasland, Netherlands, a Dutch limited liability company Filed May 28, 1956, Ser. No. 587,640

Claims priority, application Netherlands June 4, 1955

20 Claims. (Cl. 56—377)

The invention relates to devices for working crop lying on the ground and of the type provided with at least one rake wheel which is obliquely arranged with regard to the travelling direction of the associated device and which is put into rotation by its coming into contact with the ground.

Devices provided with rake wheels are generally known for the functions of raking, swath turning and tedding. The raking results in that all material is piled in very high swaths, so that this should be postponed until there is no further need for the crop to dry on the land. The turning of swaths by means of rake wheels results in that each of a number of swaths is displaced for a small distance, the swath making a rolling movement with the lowermost crop coming to the top. If there is no wind, the interior of a swath processed in this way dries slowly, requires repeated turning.

The tedding of crop by means of rake wheels results in that crop piled in swaths is displaced for a very small distance. Only for a light crop will a distinct separation be effected in the material worked by separate wheels, in which case the material during tedding will be turned in different sections at the same time. With heavy crop the effect of conventional tedding is considerably less favorable, for in this case the swath is laterally displaced as a whole and, as a consequence, no systematical turning occurs and the crop is worked irregularly. A repetition of the working will, moreover, not result in an improvement, but only in that the material lies in increasingly irregular heaps.

It is an object of the invention to provide an improved device by means of which crop can be worked in such a way that it can dry quickly.

According to the invention, a stopping member is provided behind at least one rake wheel, said stopping member resting on the ground or extending to the immediate vicinity of the ground and counteracting a lateral displacement of material set in motion by the associated rake wheel. By means of such a device, a separation can be achieved in material irregularly spread or in a swath. Thus in the case of a swath, two new swaths come into existence which are separated by an intermediate open strip. The smaller swath obtained in this way dries better and due to the adjacent open strip can be turned easily later on. According to the invention, the stopping member is preferably a rotating member which according to a further characteristic of the invention can be a wheel which is freely rotatable about an axle, which wheel is put into rotation by its coming into contact with the ground.

So far as the invention relates to a rotating stopping member which cooperates with a rake wheel, it is not limited to a placing of said member behind the rake wheel, so that the invention also relates to a device for working crop lying on the land, said working taking place by means of at least one rake wheel, with an associated rotating stopping member preventing material delivered by a rake wheel from moving too far in the delivery direction.

Further features and details will be hereinafter more fully described with reference to the accompanying drawing in which two preferred embodiments of the invention are illustrated by way of example and in which:

Fig. 1 shows a plan elevation of a first embodiment of the invention,

Fig. 2 represents a vertical section through a part of said device according to line II—II in Fig. 1, Fig. 3 is a plan view of a second embodiment of the invention, and Fig. 4 is a vertical section through a part of said device according to line IV—IV in Fig. 3.

In Fig. 1, a power source for a first embodiment of the invention is indicated as tractor 1. The tractor 1 is provided with three rear arms 2, 3 and 4 constituting together a three-point-lifting device 5. The lifting device 5 carries a fastening device 6 for the implement 7 comprising four rake wheels 8, 9, 10 and 11. The fastening device 6 is composed of two bars 12 and 13 rigidly connected to the ends of a quarter circular bow 14 as well as two strips 15 and 16 rigidly connected to a plate 17. The plate 17 carries a pin 18 about which is hingeable an arm 19 carrying a substantially horizontal tube 20. The forepart of said tube carries a locking device 21 which slides along the bow 14 when the tube 20 turns about the pin 18. The device 21 can be locked at a number of places on the bow 14.

An axle 22 is rotatably, but not slidably supported in the tube 20. By means of a locking pin 23 the axle 22 can be locked in the tube 20 in the position shown in Fig. 1, but there is, however, sufficient play that the axle 22 can turn almost 10° to both sides. The axle 22 carries a bar 24 to which are connected two axles 25 and 26 which are parallel to the axle 22. The hubs 27 and 28 of the rake wheels 9 and 10 are mounted, freely rotatable, on the axles 25 and 26. The prolongations 29 and 30 of the axles 25 and 26 extend through the hubs 27 and 28 and carry a mobile frame or tube 31 to which are attached at positions 32 and 33 two axles 34 and 35 which are parallel to the axle 22. The hubs 36 and 37 of the rake wheels 8 and 11 are mounted on said axles 34 and 35 so as to be freely rotatable. The hubs 36, 27, 28 and 37 are substantially in alignment.

Further, the tube 31 carries four stopping devices 38, 39, 40 and 41 for the crop, all having the same construction. This construction and the fastening to the tube 31 is more fully explained for the stopping means 38 by means of Fig. 2. The most important member of the device 38 is the separating wheel 43 provided with circumferential metal teeth or tines such as tines 44 and 45. The tines have a subsantially triangular form. The plate of the wheel 43 comprises a flat edge, but the central part is slightly convex for increasing the stiffness of the wheel.

In its central part the disc 43 is provided with a hub 46 which is freely rotatable about a horizontal axle 47. The axle forms the lower end of a vertical axle 48 which is supported rotatably in a bushing 49, said lower end being bent at right angles. The bushing 49 is attached to the tube 31 at position 50. A ring 51 below the bushing 49 and an arm 52 above said bushing are immovably attached to the axle 48, whereas a spring 53 is mounted between the ring 51 and the bushing 49 and a spring 54 between the bushing 49 and the arm 52. The free end of the arm 52 is hingedly connected to a strip 55 extending along the entire length of the tube 31, said strip 55 being connected at the same time to arms 56, 57 and 58 of the devices 39, 40 and 41, each of which corresponds to the arm 52 of the device 38. The fore-part of the strip 55 is provided with some holes such as holes 59 and 60. By means of one of these holes, the strip 55 can be engaged by a vertical pin (not shown) which is rigidly attached to the tube 31. Due to this, the arms 52, 56, 57 and 58 are kept in certain, parallel positions, and the separating wheels 43, 61, 62, 63 of the stopping means 38, 39, 40 and 41 are also thus kept in parallel positions.

In the case shown in Fig. 1, the separating wheels are arranged in such a way that each of the planes of said wheels comprises a line situated parallel to the direction of travel of the tractor 1. In order to be able to maintain said position when the tube 20 is turned about the pin 18 and is locked in another position, the position of the wheels 43, 61, 62 and 63 is adjustable with regard to the tube 31 as described.

In the case shown in Fig. 1, the working of the device described is as follows. The device works three swaths A, B and C and leaves their material in four smaller swaths D, E, F and G on the land. If the separating wheels 43, 61, 62 and 63 should be lacking, the material would not be left as four separate swaths, but as a single mass which becomes very irregular during a further treatment by means of the same device. Due to the presence of the separating wheels, however, a splitting up into four separate swaths D, E, F and G is effected which swaths, during further treatment with the same device, are displaced and turned but maintain their general shape.

With respect to swath C, for example, the material of said swath is seized by both rake wheels 10 and 11. Due to the coherence of the material lying on the ground, material is dropped behind the rake wheels 10 and 11 and is pulled along by material lying in front of said rake wheels. Thus, ordinarily the material would be displaced substantially as a body to the left. However, the separating wheel 62 pushes a part of the material moving through between the wheels 10 and 11 against the ground and by that prevents it from moving further to the left.

The shape of the tines (see elements 44 and 45 in Fig. 2) is such that the material being pushed against the ground will not be caught in the wheel. The rake wheel 10 takes a part of the material of the swath C and a part of the material of the swath B and forms the new swath F which is separated by the working of the separating wheel 62. The swath F is separated from the swath E by means of the working of the separating wheel 61, and so on.

It is important that the separating wheels are situated in the immediate vicinity of the ground, because otherwise no effective working will be obtained. Preferably the springs 53 and 54 are chosen in such a way that the separating wheel 43 during normal operation is pushed against the ground and that the wheel can adapt itself to the irregularities of the ground while continuing to contact with the ground. For that purpose, the axle 48 slides in the bushing 49.

Further, it is important that the separating wheels be rather small compared with the rake wheels located in front of them, because the point where a separating wheel pushes the crop against the ground or holds it would otherwise have a rather great distance behind the associated running wheel which is objectionable to a good working.

Further, it is advantageous that the separating wheel be of closed construction because crop easily collects in openings in the separating wheels more than in openings in a rake wheel.

Moreover, tines on the separating wheels increase the holding ability of the wheels on account of the crop being pressed together between two tines.

The rolling movement of a separating wheel is very advantageous, because undesirable sliding of the material is avoided during said rolling movement. In principle, the separating wheels could also be put into rotation other than by their coming into contact with the ground.

When the device 7 is raised sufficiently high from the ground by means of the lifting device 5 of the tractor 1 and the pin 23 is temporarily removed, the axle 22 can be turned through an angle of 180° in the tube 20, due to which the rake wheels 8, 9, 10 and 11 will occupy positions which make the device suitable for being used as a rake. The devices 38, 39, 40 and 41 which are superfluous for the raking action are put out of operation automatically, because of their extending upwards in that case.

In Figs. 3 and 4, a device is shown with which two swaths lying on the ground can be divided into four swaths. Said device comprises a loop-shaped frame 70 which is supported by running wheels 71 and 72 and provided with a draw arm 73, the fore-part 74 of which is connected to a tractor at a suitable height, after which the device can be moved in the direction of arrow V. The frame 70 further carries four parallel axles 75, 76, 77 and 78 on which four rake wheels 79, 80, 81 and 82 are mounted so as to be freely rotatable. If desired the rake wheels 79, 80 and 82 can be removed from the axles 75, 76 and 78 and, for converting the device into a side-delivery rake, they can be mounted in positions 79A, 80A and 82A on additional axles 83, 84 and 85 fixed for that purpose to the frame 70.

The axles 75 and 76 are fixed to the frame 70 by means of a bushing or element 86 which is slidable about the frame tube and which bushing 86 can be locked immovably to the frame 70 in various positions by means of locking pins 87 and 88, the axles 75 and 76 however remaining constantly parallel to the axles 77 and 78. The axle 75 carries a bow 89 on which are mounted two horizontal pins 90 and 91 (see also Fig. 4). An angle lever having arms 92 and 92A is mounted rotatably on pin 91, the longer arm 92 carrying a horizontal axle 93 for a wheel 95 provided with tines 94 and the shorter arm 92A carrying a pin 96. Between the pins 90 and 96 is stretched a draw spring 97 which tends to move the pin 96 upwards and the wheel 95 to the right in Fig. 4, said wheel thus being pushed against the ground. When, on the other hand, the wheel 95 is manually put in position 95A, the spring 97 tends to keep the wheel out of contact with the ground. In entirely the same way as the wheel 95 is attached to the axle 75, a wheel 98 (see Fig. 3) is attached to the axle 77. When the axles 75 and 76 are rotated on the frame tube 70, the wheel 95 maintains the same position with regard to the rake wheels 79 and 80.

The working of the device described is as follows. The device travels forward behind a tractor over the ground in such a way that the rake wheels 79 and 80 work a swath P and the rake wheels 81 and 82 work a swath Q. Each of the swaths P and Q is divided in two by the wheels 95 and 98 in cooperation with the rake-wheels 79 and 81, that is the rake wheel 79 forms a swath R and the rake wheel 80 a swath S from the material of the swath P. The swaths T and V are formed from the swath Q in the same way.

What we claim is:

1. A device for processing material lying on the ground comprising a mobile frame having a normal direction of travel, a freely rotatable rake wheel on said frame for engaging said material and positioned obliquely of said direction, and a rotatable stopping member on said frame and aligned with said direction, said stopping member being operatively associated with said rake wheel to engage at least a part of the material engaged by the rake wheel.

2. A device as claimed in claim 1 comprising means coupling said stopping member to the frame for adjusting the relative positions of the rake wheel and stopping member.

3. A device for working crop lying on the ground comprising a ground-supported mobile frame, at least one raking member obliquely arranged with regard to the travelling direction of the frame and coupled to said frame, the raking member being rotated by contact with the ground and the crop there upon, and a stopping member coupled to said frame in alignment with said travelling direction and arranged behind said raking member independently of said raking member for counteracting lateral displacement of the crop behind said raking member, said stopping member extending adjacent the ground, the raking and stopping members being of different size.

4. A device for working crop lying on the ground comprising a ground-supported mobile frame, at least one raking member coupled to said frame, and a stopping member coupled to said frame independently of said raking member and arranged behind said raking member in alignment with said travelling direction for counteracting lateral displacement of material behind said raking member, said stopping member comprising a rotating member, the raking and stopping members being of different size.

5. A device as claimed in claim 4, said stopping member comprising an axle mounted on said frame and a wheel freely rotatable about said axle, said wheel being put into rotation by contact with the ground.

6. A device as defined in claim 4, in which the diameter of said rotating member is smaller than the diameter of said raking member.

7. A device as defined in claim 4, in which said rotating member is located adjacent said raking member.

8. A device as defined in claim 4, in which said rotating member is a solid disc.

9. A device as defined in claim 4, in which said rotating member is movable in vertical direction with regard to said frame.

10. A device for working crop lying on the ground comprising: a ground-supported mobile frame, at least one raking member coupled to said frame, a stopping member coupled to said frame and arranged behind said raking member independently of said raking member, said stopping member being vertically movable with regard to said frame and being normally in contact with the ground, and a resilient device coupled to said stopping member for increasing the pressure of said stopping member on the ground, said resilient device being supported on the frame, the raking and stopping members being of different size.

11. A device as defined in claim 10, wherein the stopping member comprises a rotary member which is substantially planar and in which said rotating member makes an angle of less than 30° with the direction of travel.

12. A device as defined in claim 10, wherein the stopping member comprises a rotary member which is substantially planar and in which the position of said rotating member is adjustable.

13. A device as defined in claim 11, comprising tines on the circumference of said rotating member.

14. A device as defined in claim 11, in which said rotating member comprises a wheel and circumferential tines integral with said wheel, said tines being of a substantially triangular shape.

15. A device for working crop lying on the ground comprising: a mobile frame, a pair of raking members coupled to said frame, and a stopping member for said pair of raking members, said stopping member being arranged between the raking members for counteracting lateral displacement of material set in motion by at least one of said raking members, the raking and stopping members being of different size.

16. A device for working crop lying on the land and having a determinable direction of travel, said device comprising a ground-supported mobile frame, at least one raking member rotatably coupled to said frame for displacing the crop and a rotatable stopping member substantially aligned with said direction and coupled to said frame independently of said raking member in a position to prevent material displaced by said raking member from moving too far in the displacement direction, the raking and stopping members being of different size.

17. A device as defined in claim 16, comprising an axle coupled to said frame and wherein the rotatable stopping member comprises a wheel freely rotatable about said axle for being put into rotation by contact with the ground.

18. A device for working crop lying on the ground and having a determinable direction of travel, said device comprising: a ground-supported mobile frame, at least two pairs of raking members, and a stopping member arranged between the raking members of one of said pairs and independently of said raking member for counteracting lateral displacement of material, and an element movably coupled to said frame, said last mentioned pair of raking members and the associated stopping member being mounted on said element, said frame being oblique to said direction, the element being movable along the frame in a direction making an angle with the direction of travel, the racking and stopping members being of different size.

19. A device as defined in claim 18, comprising an axle, an arm supporting said axle and connected to said frame, said axle supporting the stopping member and enabling the stopping member to be lifted from the ground.

20. A device as defined in claim 19, comprising a spring between said arm and said frame, said spring keeping said arm in raised position and urging the stopping member against the ground.

References Cited in the file of this patent

UNITED STATES PATENTS

| | | |
|---|---|---|
| 743,720 | Henning | Nov. 10, 1903 |
| 2,602,280 | Crowe et al. | July 8, 1952 |
| 2,625,000 | Benbow | Jan. 13, 1953 |
| 2,819,578 | Wuster | Jan. 14, 1958 |

FOREIGN PATENTS

| | | |
|---|---|---|
| 159,137 | Australia | Sept. 30, 1954 |